Figure 1:
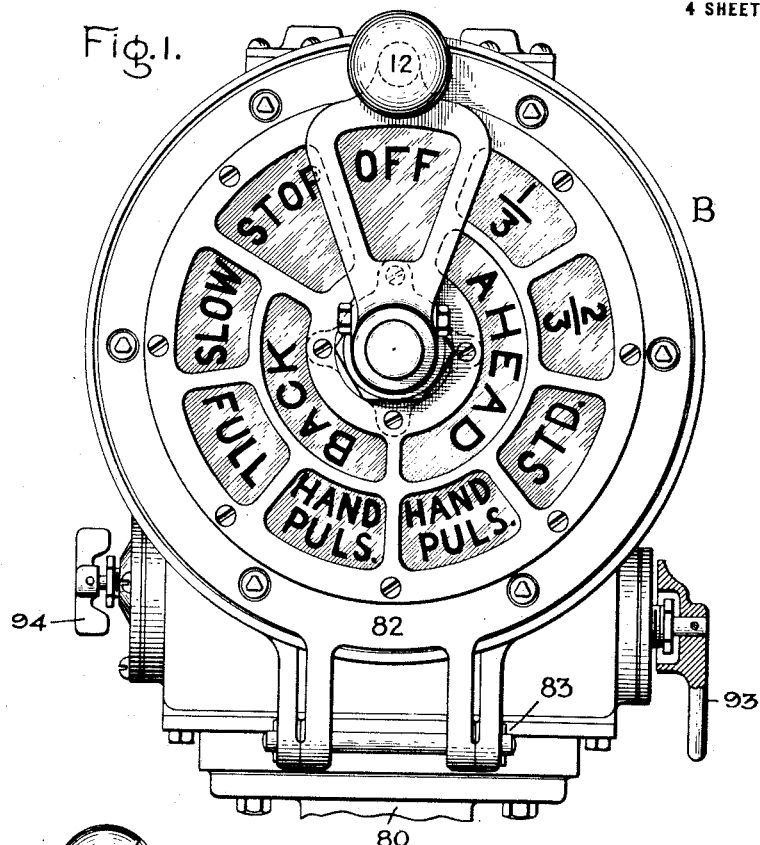

J. L. HALL.
SIGNALING SYSTEM.
APPLICATION FILED SEPT. 23, 1915.

1,258,000.

Patented Mar. 5, 1918.
4 SHEETS—SHEET 1.

Inventor:
John L. Hall,
by
His Attorney

Inventor:
John L. Hall,
by *Allen G. Davis*
His Attorney

J. L. HALL.
SIGNALING SYSTEM.
APPLICATION FILED SEPT. 23, 1915.

1,258,000.

Patented Mar. 5, 1918.
4 SHEETS—SHEET 3.

Inventor:
John L. Hall,
by
His Attorney.

J. L. HALL.
SIGNALING SYSTEM.
APPLICATION FILED SEPT. 23, 1915.

1,258,000.

Patented Mar. 5, 1918.
4 SHEETS—SHEET 4.

Inventor:
John L. Hall,
by
His Attorney

UNITED STATES PATENT OFFICE.

JOHN L. HALL, OF SCHENECTADY, NEW YORK, ASSIGNOR TO GENERAL ELECTRIC COMPANY, A CORPORATION OF NEW YORK.

SIGNALING SYSTEM.

1,258,000.      Specification of Letters Patent.      Patented Mar. 5, 1918.

Application filed September 23, 1915. Serial No. 52,291.

*To all whom it may concern:*

Be it known that I, JOHN L. HALL, a citizen of the United States, residing at Schenectady, county of Schenectady, State of New York, have invented certain new and useful Improvements in Signaling Systems, of which the following is a specification.

My invention has reference to a signaling system which is particularly applicable for conveying intelligence regarding the movement of one vessel or vehicle to another.

In the movement of vessels, especially at night, it is desirable to give to other vessels information as to the direction and speed at which the given vessel is moving. In accordance with my invention, this information is imparted by means of a signal or signals governed by a controller and by a mechanism which causes the signal to be operated at different time intervals, depending on the position of the controller. Ordinarily these signals will consist of electric lamps, particularly where the signaling system is to be used at night. Preferably, the signals comprise a plurality of groups located at different parts of the vessel, any group of which may be selected for operation by an appropriate switch. Each group of signals will usually comprise two signals of different character, and when these signals are lamps they may be of different colors, such as white, which is usually operated when the vessel is moving forward, and red when the vessel is either standing still or moving backward. The signals also preferably coöperate with the controller in such a way that in one position of the controller the given lamp or signal is continuously operated, as well as being operated at different time intervals depending on the position of the controller. For example, when the vessel is moving forward at full speed, the white lamp or equivalent signal may be continuously operated, and when the vessel is standing still the red lamp or equivalent signal may be so operated. On the other hand, when the vessel is moving forward at less than full speed, the white lamp will be flashed, or the equivalent signal operated, at different time intervals depending upon the speed of the vessel and the corresponding position of the controller. Similarly, when the vessel is moving backward, the red lamp or equivalent signal will be operated at time intervals depending on the position of the controller.

Figure 2:
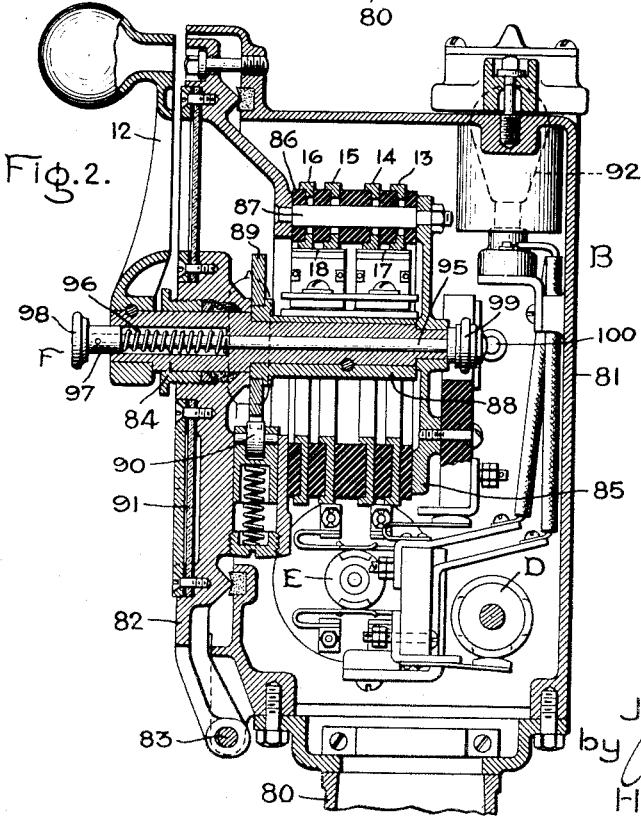
Figure 3:
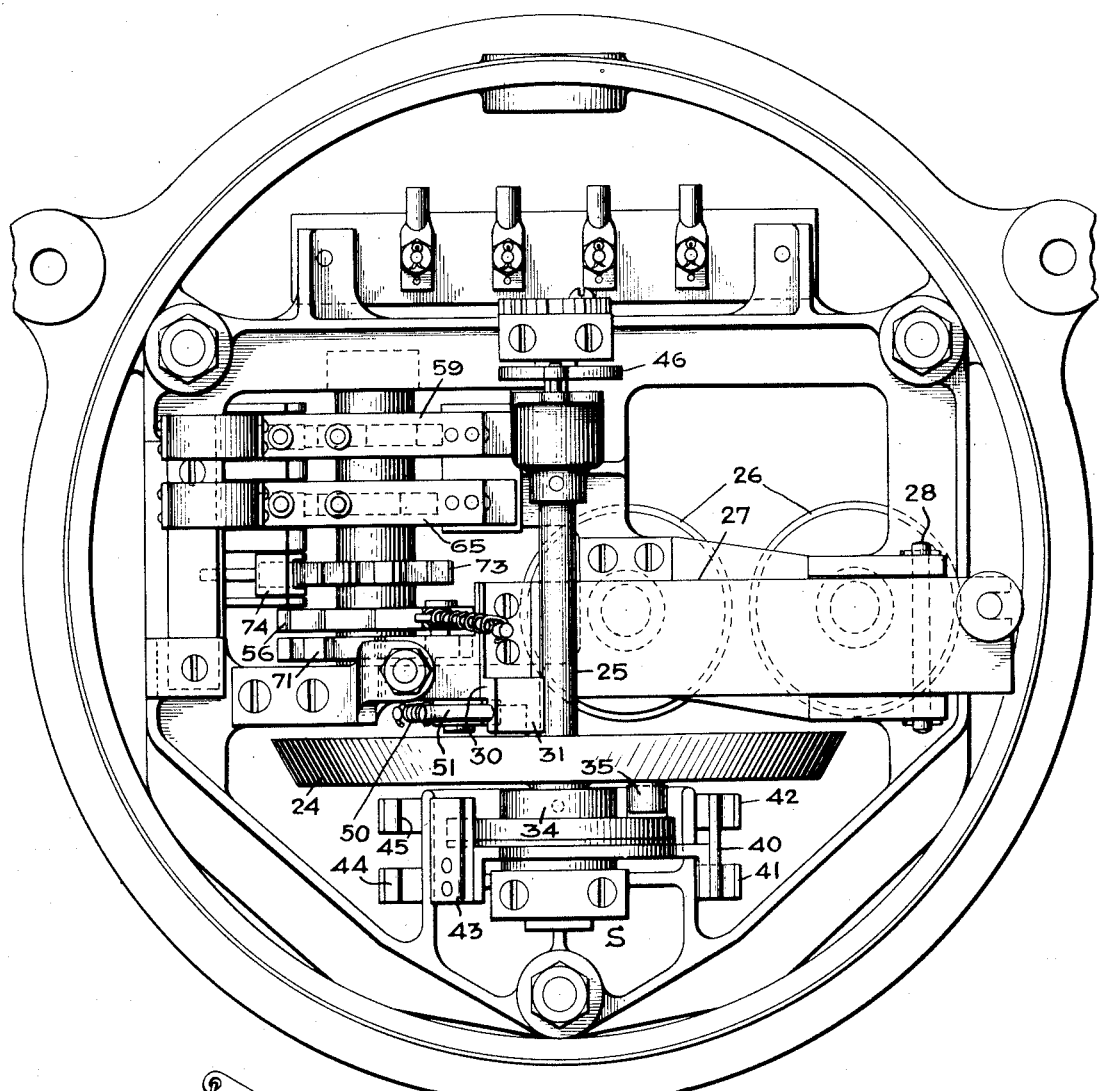
Figure 5:
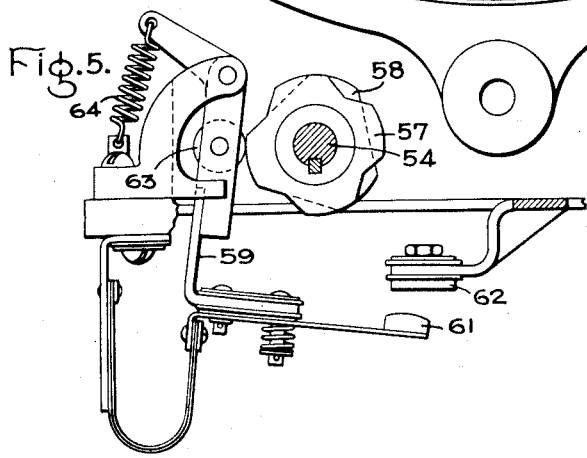
Figure 4:
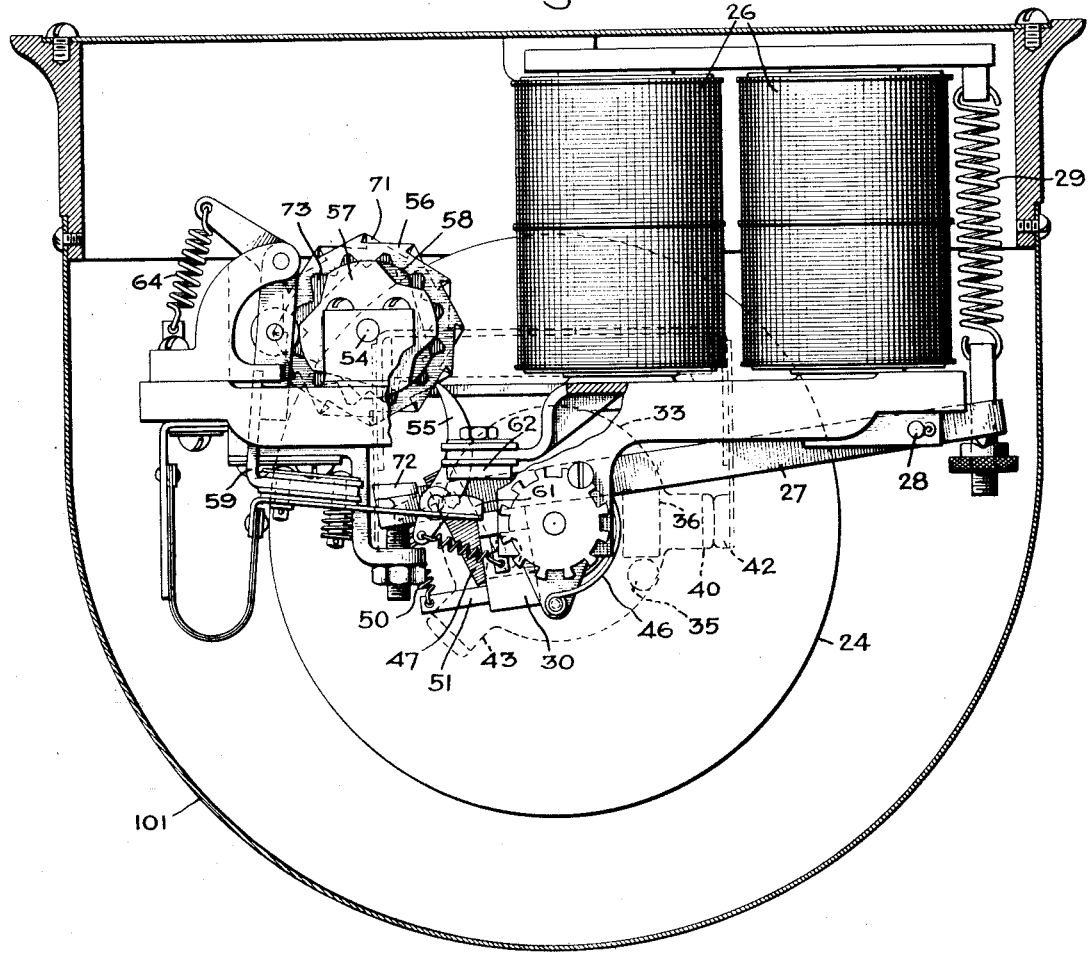
Figure 6:
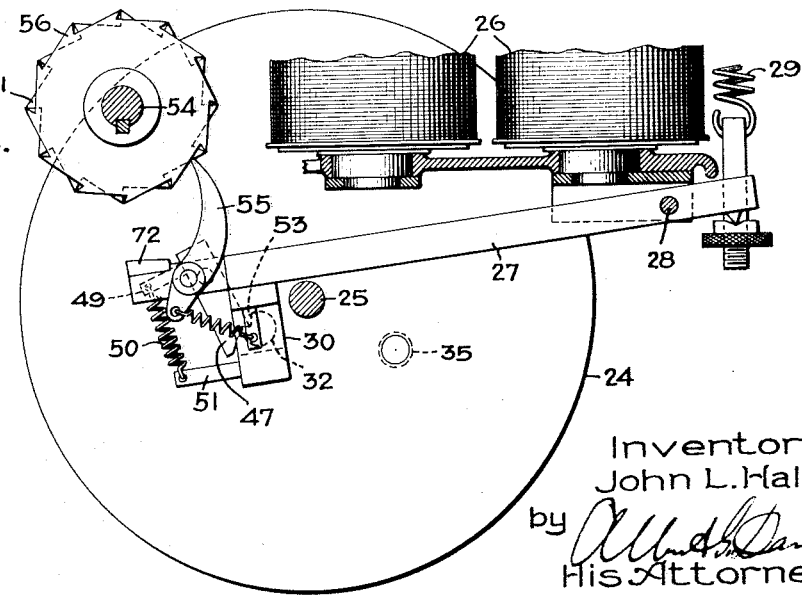

For a fuller understanding of my invention, reference may be had to the accompanying drawings, in which Figure 1 is a plan view of the controller which governs the operation of the signals. Fig. 2 is a vertical section therethrough; Fig. 3 is a side elevation of the timing mechanism which causes the signals to be operated at different time intervals; Fig. 4 is a plan view of the timing mechanism, and showing the housing therefor in cross-section; Fig. 5 is a detail view of one of the switches operated by the timing mechanism; Fig. 6 is a sectional plan view of the electromagnetically-actuated oscillating member which constitutes a part of the timing mechanism; and Fig. 7 is a diagram of the circuit connections, and showing the general arrangement of the parts of the system.

Figure 7:
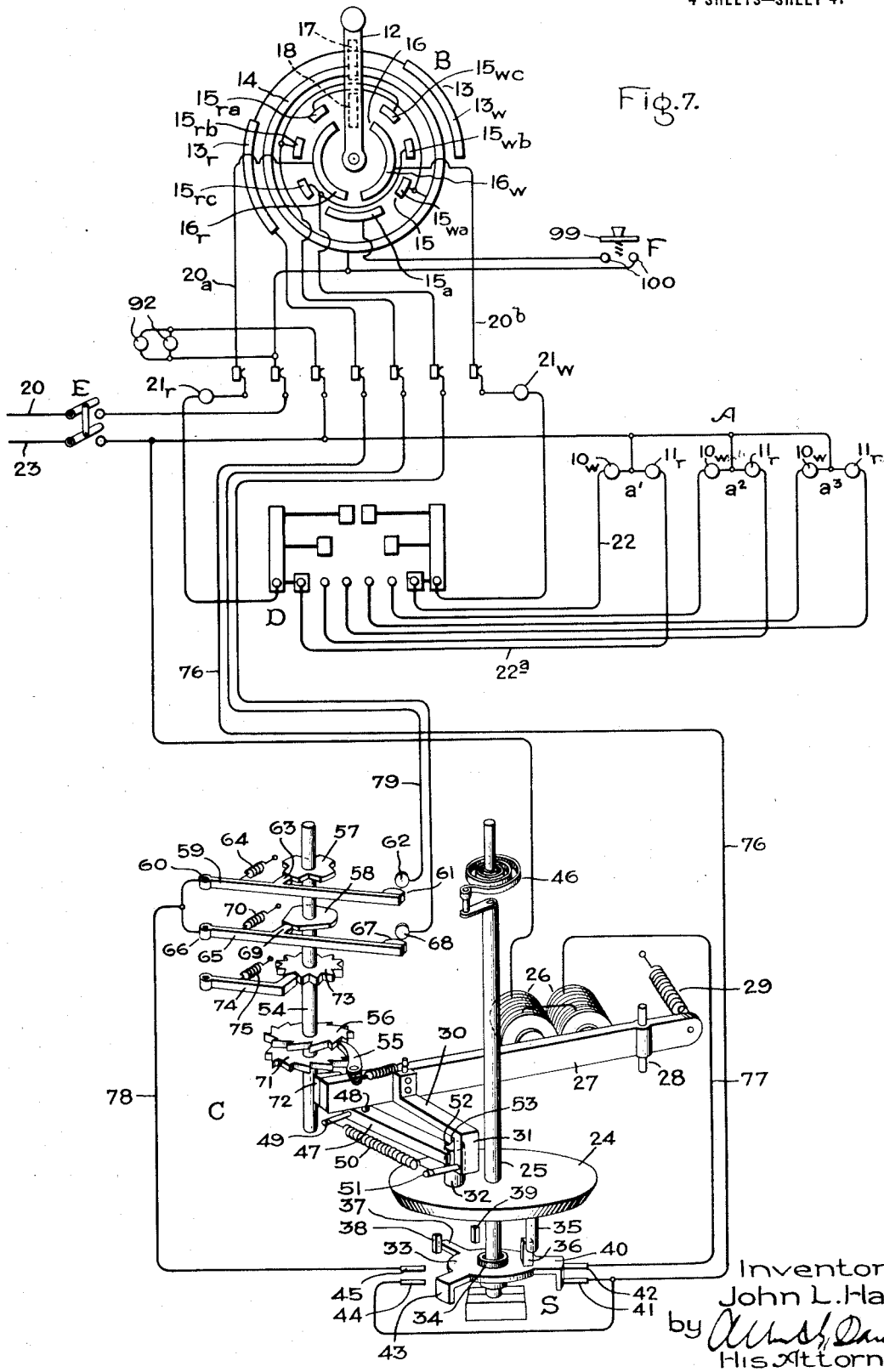

Referring, now, to the drawings, and first to Fig. 7, A indicates the signals, B the controller which will usually be located on the bridge of the vessel, C the timing mechanism for causing the signals to be operated at different time intervals, depending upon the position of the controller, D the manually selective switch for closing the circuit to any desired group of signals, and E the cut-out switch. The signals A are here illustrated as consisting of incandescent lamps. I have here shown three groups of signals, $a'$, $a^2$, and $a^3$, the first two groups, $a'$ and $a^2$, of which may be mounted on the fore and main trucks respectively of the vessel, while group $a^3$ are screen lights. Each group of lamps comprises a white lamp $10_w$, for indicating forward movement of the vessel, and a red lamp $11_r$, which indicates either that the vessel is standing still or is moving backward. The signals are governed by a controller B provided with a handle 12 which moves over four series of contacts 13, 15 and 16 and a continuous ring contact 14, which are here shown, for convenience of illustration, as concentric, but which may be in practice segmental contacts of the same radius and located side by side, as shown in Fig. 2. The outer series of contacts 13 comprises two segmental contacts $13_w$ and $13_r$; the continuous conducting ring 14 is located next to the outer series; the next to the inner series comprises on one side contacts 15_{wa}, 15_{wb} and 15_{wc}, and on the other side contacts 15_{ra}, 15_{rb} and 15_{rc}, and a contact at the bottom 15_a, while the inner series comprises a single segmental contact 16_w on one side and 16_r on the other. Bridging contacts 17, 18 are rotated by the controller handle, and are indicated in Fig. 7 by dotted lines, and are, for convenience, represented as carried by the controller handle, though in practice these contacts are carried by the shaft of the controller handle, as illustrated in Fig. 2. The outer contact 17 bridges the two outer series of contacts, and the inner contact 18 bridges the two inner series of contacts.

The system is so arranged that when the controller handle is over the right-hand portion of the dial, indicating that the vessel is moving forward, the white signal of any given group is brought into operation, and when the controller handle is over the left-hand portion of the dial, indicating either that the vessel is standing still or moving backward, the red lamp is brought into operation. Now, if the controller handle is over the portion of the dial labeled "Std," that is, standard, indicating that the vessel is moving forward at full speed, and assuming that the selective switch D is in the position to close the circuit to the group of lamps a', the contact 18 bridges the contacts 15_{wa}, and 16_w, and, assuming that the switch E is closed, a circuit is permanently closed to the white signal from the line conductor 20, to the ring 14 and contact 15_{wa}, 18 and 16_w, conductor 20_b including tell-tale lamp 21_w located at the controller, selective switch D, conductor 22, white signal lamp 10_w, to the return conductor 23. Similarly, if the controller handle is over the portion of the dial labeled "Stop," indicating that the vessel is standing still, the controller handle will be in such a position that the contact 18 bridges the contacts 15_{ra} and 16_r, and a circuit is permanently closed to the red signal from the line conductor 20, ring 14, contacts 15_{ra}, 18 and 16_r, the conductor 20_a, tell-tale lamp 21_r, selective switch D, conductor 22^a, signal lamp 11_r, and to the return conductor 23. If the controller handle is placed over the portion of the dial labeled "Ahead $\frac{1}{3}$" or "Ahead $\frac{2}{3}$," where it is placed to indicate that the vessel is moving forward at $\frac{1}{3}$ or $\frac{2}{3}$ its normal speed, then the contact 17 will engage the bridging contact 13_w and the ring 14; or if it is over the portion labeled "Back slow" or "Back full," then the contact 17 bridges the contact 13_r and the ring 14, and in any of these positions the timing mechanism C becomes active to cause the signals to be operated at time intervals depending upon the position of the controller.

The timing mechanism comprises an oscillating weighted disk 24 mounted upon a shaft 25. The disk is caused to rotate in one direction by an electromagnet 26, here shown as comprising two coils, and its armature 27, which is pivoted at 28 and biased away from the magnet 26 by a spring 29. An arm 30 is secured to the armature near its outer end, the downwardly turned end 31 of which engages a post 32 secured on the upper side of the disk. The disk in its movement actuates a switch S which comprises a plate 33 provided with a bearing 34 loosely surrounding the shaft 25 below the disk 24. A post 35 is mounted on the lower side of the disk 24 and engages a lug 36 mounted on the upper side of the plate 33. The plate 33 is provided with an arm 37 extending between stops 38 and 39 which limit the movement of the switch. The plate 33 is also provided with a switch arm 40, the end of which constitutes a bridging member for the stationary contacts 41 and 42, and with a switch arm 43, the end of which bridges stationary contacts 44 and 45. When the magnet 26 is energized the armature 27 is attracted and the projection 31 engaging the post 32 imparts a sharp movement to the disk 24, and because of the momentum of the disk its rotation is continued after the post 32 leaves the projection 31, and against the action of the spring 46 until the post 35 on the under side of the disk engages the lug 36 on the opposite side from that with which it is shown in engagement in Fig. 7 of the drawing. Plate 33 will be thus rotated until the arm 37 is brought into engagement with the stop 39, when this plate together with the disk 24 will be brought to rest in which position the switch arm 43 will bridge the contacts 44 and 45. The spring 46 then returns the disk 24 to the position shown in Fig. 7. It will thus be apparent that, when the timing mechanism C is in operation, the circuit is closed from the line alternately to the magnet 26 and to the signal, and the oscillation of the switch S would periodically operate the signal which happened at that time to be in circuit if the signal circuit were otherwise complete. An arm 47 is pivoted to the armature 27 and 48, and is provided with a post 49 to which one end of a spring 50 is attached, the other end being attached to a post 51 carried by the outer end of the arm 30. The free end of the arm 47 is provided with a notch 52 to form a shoulder, which engages in a notch 53 in the post 32, as clearly shown in Fig. 7. When, after the disk has been rotated by the magnet, the spring 46 returns the disk 24 to the position shown in Fig. 7, the shoulder formed by the notch in the post 32 drops in behind the free end of the arm 47, and thus prevents rebound of the disk.

A shaft 54 is rotated step by step by means of a pawl 55 pivoted on the armature, which engages a ratchet wheel 56 mounted on the shaft. The shaft carries one or more cams for causing the signal to operate at different time intervals depending, as more fully hereinafter explained, upon the position of the controller. I have here illustrated two such cams, 57 and 58, although it will be understood that any desired number may be used for causing any desired number of different kinds of operation of the signals. A switch arm 59 is pivoted at 60, and carries at its free end a contact 61 which engages a stationary contact 62. The arm 59 is diagrammatically shown as provided with a lug 63, which is in practice a roller as shown in Fig. 5, which lug engages the periphery of the cam 57, and which is held in engagement therewith by means of a spring 64 acting on the arm 59. While the cams may be formed in any desired manner, and the ratchet which rotates the shaft on which the cams are mounted may be provided with any desired number of teeth, I have in this arrangement used a ratchet provided with twelve teeth, which, of course, requires twelve complete oscillations of the disk 24 to bring about one revolution of the shaft 54. As shown here, the cam 57 comprises four equal segments, which lift the arm 59 and bring the contact 61 out of engagement with the contact 62, and the lug 63 remains on each segmental portion of the cam during two oscillations of the disk. The lug 63 then drops into the recess between two adjacent segments during a single oscillation. This means that the signal circuit will be open at contacts 61 and 62 during two complete oscillations of the disk, and when the lug drops into the opening, the contact 61 will engage the contact 62, and the signal circuit will be closed, provided the controller is in the proper position, and a single flash will be imparted to the signal. In other words, the signal will be eclipsed for a period of time corresponding to two complete oscillations, and then there will be a single flash. In a similar manner, the arm 65, pivoted at 66, is provided at its free end with a contact 67 which engages a stationary contact 68 and is provided with a lug 69 which is held against the periphery of the cam 58 by a spring 70. As here shown, the cam 58 is provided with three equal segments, each of which holds the contact 67 away from the contact 68 during two oscillations of the disk, and then the lug is permitted to drop into a portion cut away between two adjacent segments during two other oscillations. In other words, when the controller handle is in a position to cause the circuit to the signal to be closed through the contacts 67 and 68, the signal will be eclipsed during the period of time occupied by the disk in passing through two complete oscillations, and will then be twice flashed in succession while the disk is passing through two other oscillations.

The shaft on which the cams are mounted is prevented from over-stepping by means of a ratchet 71 having teeth oppositely disposed to those on the ratchet 56, and which are engaged by a stop 72 mounted on the armature. The shaft is secured in any position to which it is moved by means of a star-wheel 73 against which a detent 74 is drawn by a spring 75. As stated above, the circuit to the timing mechanism is completed when the contact 17 moved by the controller, bridges the ring 14 and either the contact $13_w$ or $13_r$. When either of these positions is occupied by the controller, a circuit is completed from the line conductor 20 to the ring 14, bridging member 17, contacts $13_w$ or $13_r$, as the case may be, thence through the conductor 76 to the timing mechanism. When the switch S is in the position shown in Fig. 7, the circuit is completed from the conductor 76 through the contacts 41, 40 and 42, conductor 77, magnets 26, to the return conductor 23. The oscillation of the disk 24 operates the switch S and opens the circuit to the magnet 26 at the contacts 41 and 42, and causes the arm 43 to bridge the contacts 44 and 45 to a conductor 78. This conductor is connected to each of the arms 59 and 65. Assume, now, that the controller handle is over the portion of the dial labeled "Ahead ⅓" and the member 18 bridges the contacts $15_{wc}$ and $16_w$ and member 17 bridges contacts $13_w$ and 14, then a circuit will be completed from the line conductor 20 to the arm 59, as previously described, through contacts 61 and 62 and conductor 79 to the contact $15_{wc}$, bridging member 18, contact $16_w$, conductor $20_b$, tell-tale lamp $21_w$, selective switch D, lamp $10_w$, to the return conductor. It will be remembered that the circuit of the lamp is periodically interrupted by the movement of the switch S, and the time intervals of its operation are determined by the contacts 61 and 62. Similarly, if the controller handle is over the portion of the dial labeled "Ahead ⅔" and the member 18 bridges the contacts $15_{wb}$ and $16_w$, member 17 still bridging contacts $13_w$ and 14 then the circuit to the white lamp is completed through the contacts 67 and 68. In the same way, when the controller is over the portion of the dial labeled "Back slow" or "Back full", then the member 18 connects the contact $16_r$ to either the contact $15_{rb}$ or $15_{rc}$, and the circuit is completed to the red signal lamp $11_r$, from the contact $16_r$, and the red signal is caused to operate at time intervals the same as were those of the white signal previously described. It will thus be apparent that the controller closes the circuit of one signal in one range of movement, and that of the other signal in another range, and that the timing mechanism imparts to the signals different modes of operation corresponding to different positions of the controller within either range of movement.

It will be apparent that, when the timing mechanism C is in operation, both cams 57 and 58 are continuously operated, but that a circuit to but one of the lamps is completed at a given time through one set of contacts 61, 62 or 67, 68, the circuit for the other set of contacts being open at the controller.

While the structure and principle of operation of my invention will be clear from a consideration of Fig. 7, reference may be had to the remaining figures for additional details of a mechanism which I have in practice used in a device in which my invention is embodied.

Referring to Figs. 1 and 2, 80 is a support or standard on which the controller B is mounted. The controller mechanism is housed within a casing 81, the front section 82 of which is hinged at 83 to afford ready access to the mechanism of the controller. The controller handle 12 is mounted on a shaft 84 which is journaled in the front section 82 of the casing and in a plate 85 which is rigid with the front section 82. The support for the plate 85 is built up of the contacts 13, 14, 15 and 16, between which are interposed insulating members 86, all of which are clamped together and to the front of the casing by bolts 87. The contacts 17 and 18 are mounted on a sleeve 88 which is in turn mounted on the shaft 84. A star-wheel 89 is mounted on the sleeve 88 and is engaged by a spring pressed detent 90 which holds the star-wheel, the shaft 84, and the controller in any position to which they are moved. A glass or other transparent panel 91 is mounted on the front of the controller casing, through which legends are visible. Illuminating lamps 92 are mounted on the interior of the casing and are permanently connected to the line, as indicated in Fig. 7. The selective switch D and cut-out switch E are provided with handles 93 and 94, respectively, by which the switches may be manually operated. The hand pulsator F comprises a bar 95 passing through the shaft 84 and is biased toward the front of the casing by a spring 96 surrounding the bar and engaging a shoulder on the shaft and a collar 97 secured on the outer end of the bar 95. The bar is provided with a handle 98, by which the bar may be moved longitudinally. The inner end of the bar is provided with a bridging contact 99 which engages the stationary contacts 100 (but one of which is shown in the drawing). The timing mechanism illustrated in Figs. 3 and 4 is housed in a suitable casing 101.

The complete operation of the device described above, which embodies one form of my invention, is as follows:

The selective switch D is first moved to a position to connect into the line circuit one of the group of lamps $a'$, $a^2$ or $a^3$ which it is desired to operate. The controller handle is then moved to a position over the legend on the dial indicative of the movement of the vessel. The cut-out switch E is then closed. When the vessel is moving forward at full speed, or has stopped, the controller is moved over the legend "Std" or "Stop," respectively, and the lamp $10_w$ or $11_w$, as the case may be, is permanently connected in circuit. When the controller handle is moved to a position over "⅓," indicating that the vessel is moving forward at ⅓ speed, a circuit is closed from the line conductor 20, ring 14, contact $13_w$, conductor 76, contacts 41, 40, 42, conductor 77, electromagnet 26, to the return conductor 23. The magnet 26 is thus energized, and the movement of its armature causes the disk 24 to rotate against the action of the spring 46 until the engagement of the post 35 on the opposite side of the lug 36 of the plate 33 from that with which it is shown in engagement in Fig. 7, causes the plate 33 to rotate until the arm 37 engages the stop 39, when the circuit to the electromagnet will be broken at the contacts 41 and 42, and the arm 43 will bridge the contacts 44 and 45. As soon as the circuit to the magnet is broken, the spring 46 returns the disk to the position shown in Fig. 7, and a periodic oscillation of the disk is thus set up which opens the circuit of the signal at regular intervals at the contacts 44 and 45. With the controller handle in the position assumed, the circuit is completed from the contact 45, through the conductor 78, arm 59, contacts 61, 62, conductor 79, contacts $15_{wc}$, 18, $16_w$, conductor $20_b$, selective switch D, conductor 22, white lamp $10_w$, to the return conductor 23. The movement of the cam 57 causes the circuit of the signal to be interrupted at the contacts 61, 62 in such a way as to cause two eclipse periods to be followed by a single flash, as described above. Similarly, when the controller handle is over the legend "Slow," and the members 17 and 18 bridge the contacts $13_r$, 14 and $15_{rb}$ and $16_r$, respectively, the red lamp is caused to operate in the same manner as was the white lamp when the controller was over the legend "⅓." When the controller is over the legend "⅔," or "Full," then the circuit of either the white or the red lamp will be interrupted at the contacts 67 and 68, and the distinctive characteristics of the cam 58 as above described will be impressed upon the signal.

In case the automatic mechanism for operating the signal is disabled, or if for any other reason it is desired to manually operate the signal, then the controller is moved to a position over the portion of the dial labeled "Hand Puls.", and is moved to the right-hand portion or the left-hand portion according as it is desired to operate the white or the red lamp. If, for example, it is desired to operate the white lamp, then the controller is moved over the label at the right, when the member 18 will bridge contacts 15$_a$ and 16$_w$. A circuit is then closed from the line conductor 20, through the contacts governed by the hand pulsator, contacts 15$_a$, 18, and 16$_w$, conductor 20$_b$, tell-tale lamp 21$_w$, selective switch, conductor 22, white lamp 10$_w$, to the return conductor 23. Similarly, if the controller is moved over the label "Hand Puls." at the left of the vertical line, then the member 18 bridges the contacts 15$_a$ and 16$_r$, and a circuit is closed through the red lamp 11$_r$, and the hand pulsator is operated so as to cause the signal to be operated in such a way as to approximate the character of signal given when the timing mechanism C is in operation and either of the cam disks is interrupting the circuit.

In accordance with the provisions of the patent statutes, I have described the principle of operation of my invention, together with the apparatus which I now consider to represent the best embodiment thereof; but I desire to have it undertsood that the apparatus shown is only illustrative, and that the invention can be carried out by other means.

What I claim as new and desire to secure by Letters Patent of the United States, is:—

1. In a signaling system, a pair of electric signals, a controller therefor, and means whereby either one of said electric signals is caused to be operated at varying intervals, depending upon the position of the controller.

2. In a signaling system, a pair of differently colored electric lamps, a controller for closing the circuit to one or the other of said lamps, and means for flashing either of said lamps at different time intervals, depending upon the position of the controller.

3. In a signaling system, a pair of electric signals of different character, a controller for closing the circuit of one or the other of said signals, depending upon its position, and means for permanently closing one or the other of said circuits in certain positions of the controller, and for causing the circuits to be made and broken in other positions of the controller and at varying time intervals, depending upon the position thereof.

4. In a signaling system, an electrically-operated signal, a controller therefor, and means comprising an electromagnetically-operated oscillating member for causing said signal to operate at different time intervals, depending on the position of the controller.

5. In a signaling system, a pair of electrically-operated signals, a controller therefor, and means comprising an electromagnetically-operated oscillating member and a cam actuated thereby for making and breaking the circuit of one or the other of said signals depending on the position of the controller.

6. In a signaling system, a pair of electrically-operated signals, a controller therefor, means for closing the circuit of one of said signals through one range of movement of the controller, and to the other signal through another range of movement thereof, and means operative within either range of the controller for causing the signal to be permanently or intermittently operated, depending upon the position of the controller.

7. In a signaling system, a pair of electrically-operated signals, a controller therefor, means for closing the circuit of one of said signals through one range of movement of the controller, and that of the other signal through another range of movement thereof, means operative within either of said ranges of movement for causing a given signal to be permanently operated in one position, and means operative within either range and comprising an electromagnetically-operated cam for intermittently actuating the signal in another position of the controller.

8. In a signaling system, a pair of electrically-operated signals, a controller therefor, means for closing the circuit of one of said signals through one range of movement of the controller, and that of the other signal through another range of movement thereof, means operative within either range of movement for causing the signal to be permanently operated in one position of the controller, and means also operative within either range and comprising an electromagnetically-actuated oscillating member and cams actuated thereby for causing either signal to be operated at different time intervals, depending upon the position of the controller.

9. In a signaling system, an electrically-operated signal, a controller therefor, and a timing mechanism coöperating with said controller for periodically making and breaking the signal circuit at one point and for intermittently making and breaking the same at another point.

10. In a signaling system, an electrically-operated signal, a controller therefor, and an electromagnetically-actuated timing mechanism for periodically making and breaking the signal circuit at one point and for intermittently making and breaking said circuit at another point.

11. In a signaling system, an electrically-operated signal, a controller therefor, and a timing mechanism coöperating with said controller for periodically making and breaking the signal circuit at one point and for making and breaking said circuit at another point, the breaks at the latter point extending through one or more periods of make and break at said first point.

12. In a signaling system, an electrically-operated signal, a controller therefor, and a timing mechanism coöperating with said controller and comprising an oscillating member for periodically making and breaking the signal circuit at one point, and also comprising a cam for making and breaking the signal circuit at another point, the period of break at the latter point extending through one or more periods of make and break at the first point.

13. In a signaling system, an electrically-operated signal, a controller therefor, and an electromagnetically actuated timing mechanism coöperating with said controller and comprising an oscillating member for periodically making and breaking the signal circuit at one point, and also comprising a cam for making and breaking said circuit at another point, the period of break at the latter point extending through one or more periods of make and break at the first point.

14. In a signaling system, a group of electrically operated signals comprising two signals of different character, a controller movable to a plurality of positions and closing the circuit of one signal within one range of movement, and that of the other signal through another range, and means for imparting to the signals various modes of operation corresponding to different positions of the controller.

15. In a signaling system, a plurality of groups of electrically operated signals, each group comprising two signals of different character, a selective switch for controlling the circuits of the various groups of signals, a controller for closing the circuit of one signal of a given group within one range of movement, and the other signal during another range of movement, and movable to a plurality of positions in each range, and means for imparting to the signals different modes of operation depending on the position of the controller.

16. In a signaling system, a group of electrically operated signals comprising two signals of different character, a controller for closing the circuits of one signal within one range of movement and the other signal within another range of movement, and movable to a plurality of positions in each range, and means for operating the signals during various time intervals depending on the position of the controller.

In witness whereof I have hereunto set my hand this 22nd day of September, 1915.

JOHN L. HALL.